United States Patent
Kelly

(10) Patent No.: US 8,825,897 B2
(45) Date of Patent: Sep. 2, 2014

(54) POSITIONAL ADDRESSING FOR A COMPUTER CLUSTER

(75) Inventor: Edmund J. Kelly, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 2171 days.

(21) Appl. No.: 10/949,611

(22) Filed: Sep. 24, 2004

(65) Prior Publication Data

US 2006/0085555 A1 Apr. 20, 2006

(51) Int. Cl.
*G06F 15/173* (2006.01)

(52) U.S. Cl.
USPC .......................................... 709/238; 709/224

(58) Field of Classification Search
None
See application file for complete search history.

(56) References Cited

U.S. PATENT DOCUMENTS

| | | | |
|---|---|---|---|
| 5,675,830 A * | 10/1997 | Satula | 710/9 |
| 6,325,636 B1 * | 12/2001 | Hipp et al. | 439/61 |
| 6,493,759 B1 * | 12/2002 | Passman et al. | 709/227 |
| 6,636,499 B1 * | 10/2003 | Dowling | 370/338 |
| 7,051,215 B2 * | 5/2006 | Zimmer et al. | 713/300 |
| 7,188,195 B2 * | 3/2007 | Coffin et al. | 710/22 |
| 7,203,729 B2 * | 4/2007 | Chen et al. | 709/209 |
| 2002/0103893 A1 * | 8/2002 | Frelechoux et al. | 709/223 |
| 2002/0112231 A1 * | 8/2002 | Lundback et al. | 717/170 |
| 2002/0133727 A1 * | 9/2002 | Dervin et al. | 713/310 |
| 2002/0166020 A1 * | 11/2002 | Irving et al. | 710/301 |
| 2005/0125556 A1 * | 6/2005 | Curran et al. | 709/238 |
| 2005/0256942 A1 * | 11/2005 | McCardle et al. | 709/220 |

* cited by examiner

*Primary Examiner* — Minh-Chau Nguyen
(74) *Attorney, Agent, or Firm* — Martine Penilla Group, LLP

(57) ABSTRACT

A cluster of computers including a plurality of processing nodes, a command network connecting to each of the processor nodes, and circuitry for addressing each of the processor nodes on the command network based on a position of the processor node on the command network.

9 Claims, 5 Drawing Sheets

POSITIONAL ADDRESSING FOR A COMPUTER CLUSTER

BACKGROUND OF THE INVENTION

1. Field of the Invention

This invention relates to clusters of computers and, more particularly, to apparatus and methods for addressing individual computer processor nodes arranged in a networked cluster.

2. History of the Prior Art

Computers have developed along a number of different but similar lines. In general, each such line has begun with a relatively simple processor capable of manipulating bits of information stored in some particular format. Storage for control software and data being manipulated is provided. Circuitry for providing input and output to the processor and for viewing and controlling the operation is also provided.

As the hardware for each type of digital computer is being developed to a useful state, various forms of software are usually being developed to make use of its capabilities. When one generation of software proves economically useful, more software is developed to make use of more of the capabilities of the computer hardware. When the software has stretched the capability of the hardware to its limits, the hardware must be improved and memory increased so that more, larger, and more capable programs may be run. With each new development, additional uses are visualized and newer generations of the computer are developed. This increase in computer capabilities seems to take place whatever the particular computer type may be until that type of computer reaches some practical limit.

Recently, even the most advanced computer architectures seemed to have been developed to a point at which increases in their capabilities do not provide an increased return in overall proficiency. For example, in order for a typical processor to handle more information faster, the number of transistors utilized by the processor and its memory are typically increased. This requires putting more transistors on the processor chip and placing the various components closer together. An increase of four times the number of processing transistors along with a commensurate increase in local memory is generally thought to increase speed of performance by ten to fifteen percent. Theoretically, a larger number of smaller transistors with shorter interconnections may be operated more rapidly with the expenditure of less power along the shorter current paths. However, the larger numbers of paths and transistor devices operating more rapidly expends more power; and a point seems to be rapidly approaching (or to have been reached already with some architectures) at which the proximity of the transistors devices and associated connecting circuitry increases interference and current leakage to a point at which overall operation deteriorates.

Various architectural changes have been attempted to obviate this limiting difficulty. Newer designs have tended to utilize a large number of processors which share the internal memory and other components of a single computer. Utilizing a number of processors tends to reduce the need to place so many transistors on a single chip thereby reducing individual processor complexity. This method of approaching the problem seems to work but only up to a limit; then a new set of problems arises. More particularly, the ability to control the access by a large number of processors to common memory reaches a limit fairly rapidly. Consequently, this method of development also appears to present an architectural dead end.

Another approach which has been taken to overcome the limitations posed by the known computer architectures is called clustering. In clustering, a large number of what may be relatively unsophisticated computers are joined by switches and cabling in a form of network by which those computers may share data. Then an operating system is provided by which all of the individuals computers may cooperate in handling large problems. Clustering offers a number of advantages. It allows controlling software to assign individual portions of a particular operation being undertaken to individual computers of the cluster, those portions to be handled by those individual computers, and the results of the individual portions to be furnished to the other computers from the cluster when they become available. This essentially allows a large operation to be broken into smaller operations which can be conducted in parallel.

Clustering is especially advantageous in allowing the use of a large number of inexpensive individual computers to handle a problem typically requiring a much more sophisticated and expensive computer. This allows the basic hardware of a cluster to be relatively inexpensive when contrasted to the hardware cost of advanced computers in which a number of processors share memory. Clustering does not seem to reach the computational limits of shared-memory multiprocessor machines since each individual computer of the cluster controls its own internal memory and computing operations. Moreover, for various reasons, clustering has been adopted by researchers who believe that software design is advanced when the software is freely available to those who might contribute to its improvement; consequently, a great deal of useful software is available inexpensively. For example, system software for clustering is available through the "Beowulf" project.

Because of these advantages, clustering has been increasingly used as a method for handling large problems.

However, clustering has a number of inherent difficulties which have limited its use to a research tool. First, the use of clusters has typically been restricted to highly capable computer scientists. This results because of the large amount of knowledge required for the operation of a cluster. For example, to set up a cluster requires that the individual computers all be joined together in some form of network by which cooperation can be coordinated; this requires a sophisticated knowledge of networks and their connections. Once the physical network is established, the various switches of the network must be configured before the cluster can be brought into operation. Once the switches have been configured, each individual computer must be booted and its correct operation in the network tested; this typically requires a local operator and a coordinating administrator at a selected controlling one of the computers. Bringing a cluster into operation typically requires a large staff of engineers and may take days. Because of the difficulty of start-up, once a cluster is running, it is typically kept running at all costs.

Keeping a cluster running is also quite difficult and time consuming. Once in operation and handling a particular problem, any failure of an individual computing unit requires that the failure be known to and its handling be coordinated with all of the other units. The system software controlling the cluster must be able to indicate to all of the units that a particular unit has malfunctioned and take steps to obviate the problem. This requires advising each individual unit that a particular unit has malfunctioned, taking steps to see that any incorrect data is isolated, and handing the function of that computing unit to some other unit. This often requires a significant amount of operating time. A full time staff is needed to coordinate the operation of a cluster, to keep the cluster functioning, and to handle problems as they arise.

Clusters have other problems. Like other computers, the individual units of a cluster require power to operate and because of that generate heat. The power required to operate the individual computers of a cluster, the switches connecting the units of the cluster, and associated air conditioning is similar to that required to operate super computers having similar processing power.

The power requirements for operating and the staffing needed have rendered the actual costs of using clusters similar to those for computer systems of similar capabilities. All of these problems have typically limited the use of clusters to high end laboratory use.

One basic problem which clusters face is in arranging the individual computers to function as a cluster. To a great extent, this is accomplished by the system software. In a typical cluster, a great deal of the system software and operating time is consumed assigning tasks and keeping track of the operations of the different individual computers so that the results provided by those computers can be melded with the results of the other individual computers in the cluster. One difficult aspect of this keeping track is addressing the individual computers in a consistent manner.

It is desirable to provide new methods and apparatus for providing clusters of computers capable of easy administration and economic operation.

SUMMARY OF THE INVENTION

The present invention is realized by a cluster of computers including a plurality of processing nodes, a command network connecting to each of the processor nodes, and circuitry for addressing each of the processor nodes on the command network based on a position of the processor node on the command network.

These and other objects and features of the invention will be better understood by reference to the detailed description which follows taken together with the drawings in which like elements are referred to by like designations throughout the several views.

DETAILED DESCRIPTION

Figure 1:
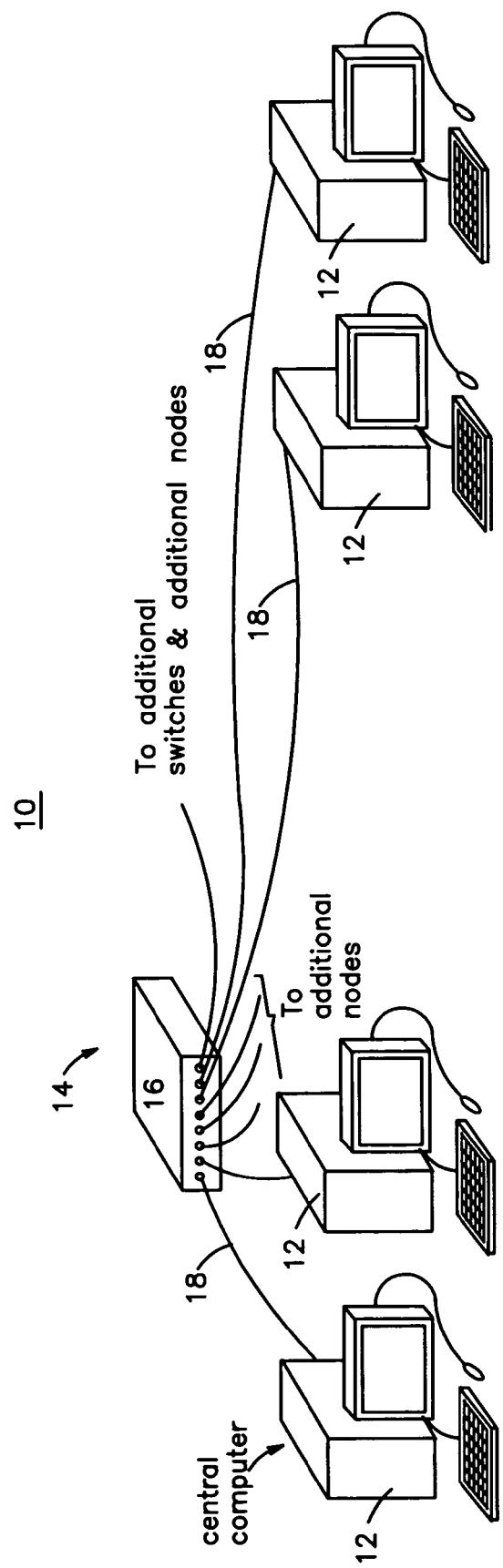
FIG. 1 is a diagram illustrating a computer cluster designed in accordance with the prior art.

FIG. 1 illustrates a typical computer cluster 10 designed in accordance with the prior art. The cluster 10 essentially comprises a plurality of individual computers 12 associated with one another over a network 14. Each of the computers 12 is capable of individual operation and for this purpose includes a processor, local memory, and various input and output devices. Among those input and output devices may be a monitor for viewing operations being conducted utilizing the processor, a keyboard, a mouse, compact disk (CD), DVD, and floppy disk drives by which operations of the processor may be controlled. Each of the computers 12 may also include devices associated with the processor for providing graphic presentations on the monitor, for providing sound outputs, for connecting to the network 14, and the like. The individual computers 12 in the cluster 10 are all shown with monitors, keyboards, and mice although only a few of these devices are typically used in an actual cluster; and those used are often moved about and shared among computers.

The network 14 by which the individual computers 12 are associated in a typical computer cluster 10 may be an Ethernet network or other type of network (including one of various proprietary networks) by which the individual computers 12 may be linked for the transfer of data. In order to allow the individual computers 12 to function together as a cluster, the network 14 includes a plurality of switches 16 (only one of which is illustrated) and various cables 18 joining network connectors (not shown) at the individual computers 12 to the switches 16. Before the cluster 10 can be operated, the individual switches 16 must each be configured to function with the individual computers 12. This configuring includes, among other things, the assignment of network addresses to each of the individual computers. These network addresses are then utilized by control software running on one of the processors to generate lists by which the individual computers 12 may be identified and assigned particular operations in the cluster.

A typical cluster 10 has no arrangement for controlling the individual computers 12 of the cluster 10 other than the controls normally offered by any individual computer; consequently, control of the cluster 10 must be exercised by transferring software commands among the individual computers 12 via the network 14 once all of the individual computers 12 have been brought into operation.

Because a typical cluster 10 has no means other than the network 14 for overall control, the individual computers 12 of the cluster 10 must be brought into operation individually. That is, each individual computer must be turned on and booted into operation.

A typical cluster 10 has no means by which the status of any computer in the cluster may be determined other than over the network. Therefore, in bringing a cluster into operation, it is necessary for an operator at each individual computer to establish network communications with an operator on a central one of the computers (often referred to as a "head node") and assure that operations over the network are taking place correctly before the pluralities of computers can be operated as a cluster.

It will be apparent to those skilled in the art that the initialization and operation of a computer cluster 10 is a demanding process requiring a significant amount of skilled manpower. In fact, the initialization of a large cluster 10 in accordance with the prior art may require days of time before all of the individual computers 12 are enabled and communicating effectively with the central one of the computers 12. Because of this, a large staff of skilled computer scientists is typically provided to assure that a cluster 10, once in operation, continues to function correctly.

In order to keep a cluster 10 in operation once it is functioning, control software is provided by which any failure at a particular computer 12 may be detected and corrected. This requires that when an individual computer 12 malfunctions, the fact of the malfunction be communicated to all of the other computers 12, any operations dependant on the results of the operations by the malfunctioning computer 12 be suspended, and the malfunction corrected. The control software necessary to this end is quite extensive in the typical cluster 10.

Each of the switches 16 typically includes processors and other devices necessary to allow the correct configuration of the switch 16 for association with the individual computers 12. Associated with each of the switches 16 and each of the computers 12 in the cluster 10 (although not shown) is equipment such as air conditioning for cooling and maintaining the correct temperature for operation of the cluster system. For a cluster 10 capable of significant operations such as those provided by supercomputers, the power required for operation of the cluster 10 and its associated cooling equipment is of the same magnitude as that required for operation by similarly capable supercomputers.

Figure 2:
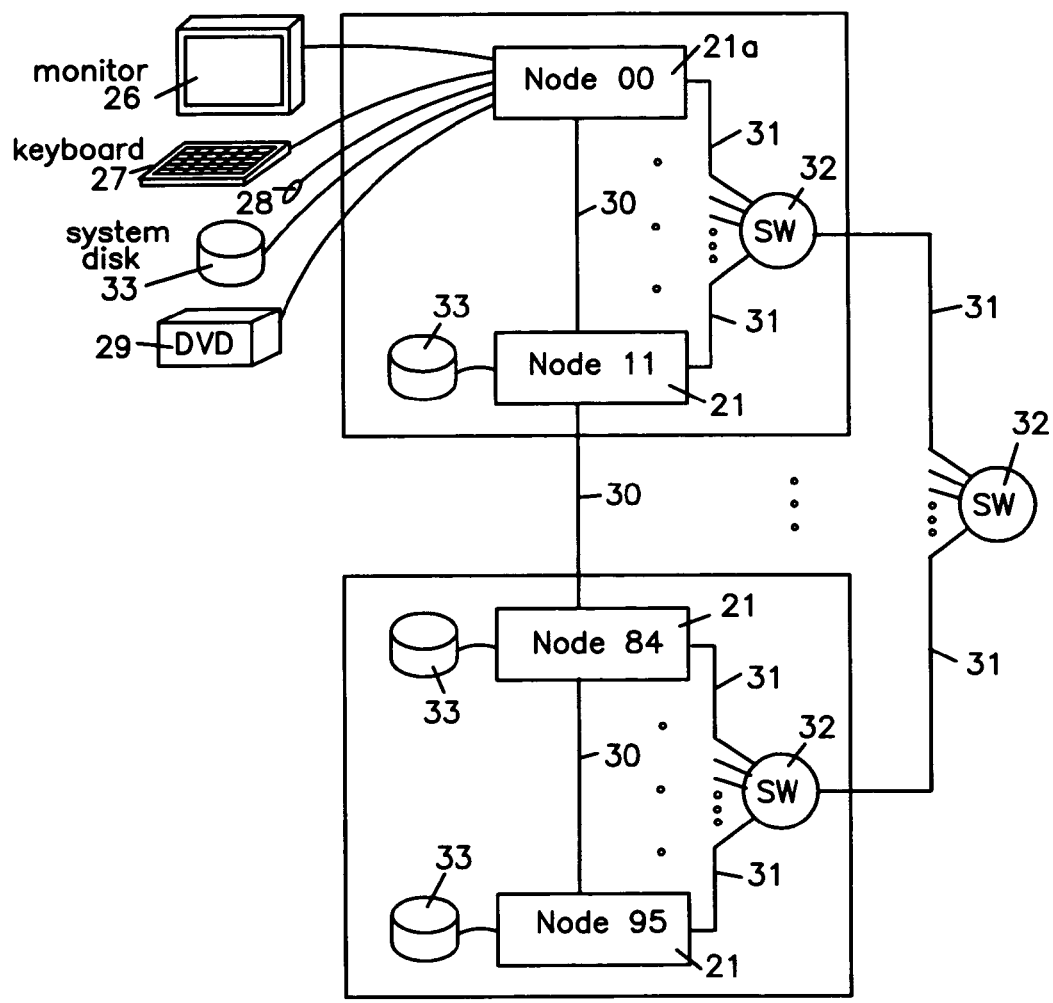
FIG. 2 is a diagram illustrating a computer cluster designed in accordance with the present invention.
Figure 3:
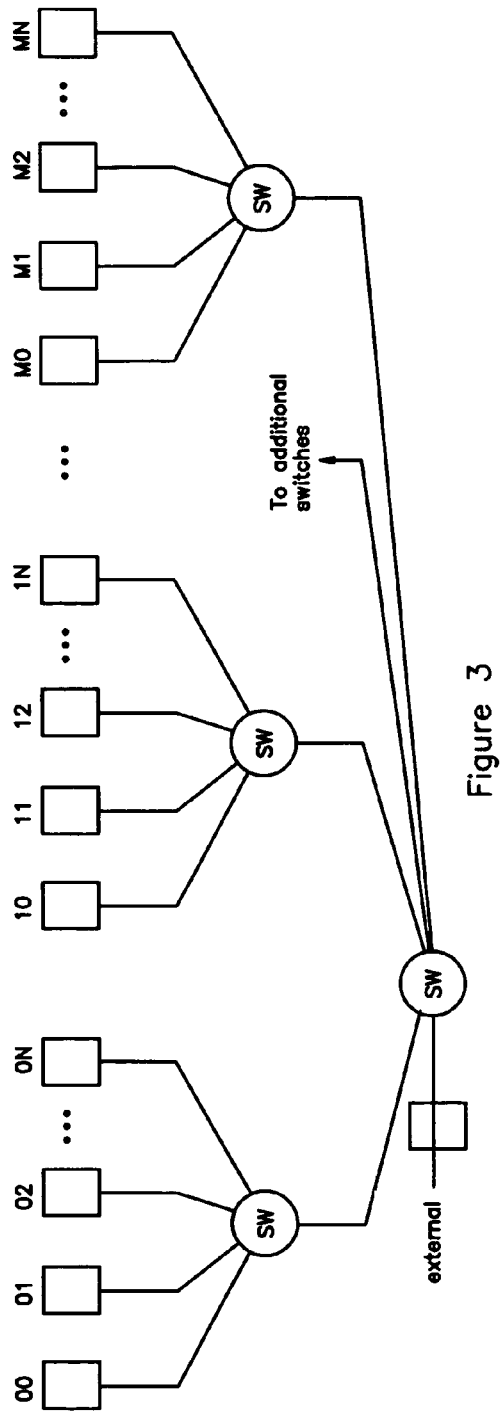
FIG. 3 is a diagram illustrating a first network for a computer cluster utilizing the present invention.

FIG. 2 is a diagram illustrating a computer cluster 20 designed in accordance with the present invention. The cluster 20 includes a plurality of individual processor nodes 21 which in a preferred embodiment are selected to be identical. For example, to assure that each processor node executes software identically, the various components of each node may be selected to have identical version numbers. Each processor node 21 includes a processor 25, typical connecting circuitry, and local memory 23 which in one embodiment may include long term memory such as a local hard disk drive 24. One of the processor nodes 21a is also provided input and output devices such as a monitor 26, a keyboard 27, a mouse 28, and a DVD or CD device 29.

It should be noted that the individual processor nodes 21 are typically comprised of individual parts which are purchased for the construction of typical personal computers. However, the individual processor nodes 21, apart from node 21a, include only the minimum of components necessary to turn on and process data. These individual nodes do not typically include components normally found on a personal computer such as video display circuitry; input and output devices (other than as noted herein) such as monitors, keyboards, mice, DVD or other disk devices; sound circuitry; and the like. The elimination of these devices greatly reduces the power required to operate the individual nodes and the cooling equipment which would be necessary to dissipate the heat generated by such power. Moreover, in one embodiment, those components which are included in the individual nodes are selected from those offering low power operation. For example, low power processors are preferred. Hard disks 33 are included at processor node 21a but are optional at the other processor nodes; and, if included, low-power-consuming disks such as those used in portable computers are preferred.

In order to arrange the processor nodes 21 to function as a cluster, first and second networks 30 and 31 are provided. The first network 30 is a command and control network. The second network 31 functions as a more typical cluster network (such as an Ethernet network) over which data may be transferred among the various processor nodes 21 of the cluster.

In a preferred embodiment of the invention, the second network 31 differs from those networks typically utilized by clusters in that it includes only those attributes of such a network required for operation. For example, a typical Ethernet network utilized in a cluster arrangement includes a plurality of programmable switches and removable cabling connecting the switches to the individual computers of the cluster in the manner shown in FIG. 1.

Figure 6:
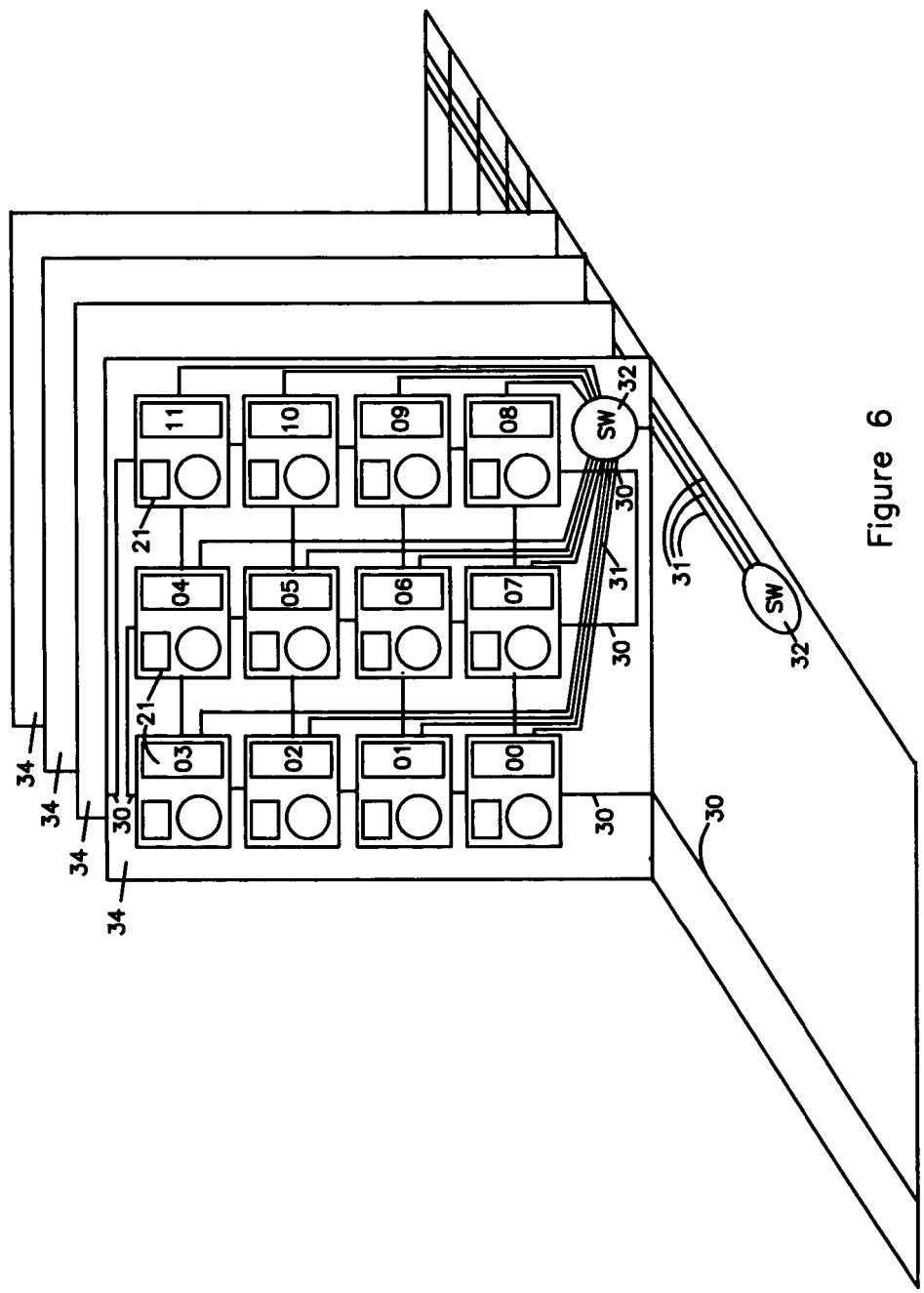
FIG. 6 is a diagram illustrating a portion of the computer cluster shown in FIG. 2.

In the present arrangement, processors used for configuring the switches and the removable cabling joining the switches to the processor nodes of a cluster have been eliminated. Instead of configurable switches, the switches of the network 31 are typically non-configurable switches hardwired to network connector circuitry at each processor node 21 by simple traces on a printed circuit board (or similar connections) rather than the usual long plugged network cabling (see FIG. 6). To function with such switches, each processor node 21 has a preselected processor node identifier which may be used for various purposes including as a basis for its address on the network 31. A particularly useful means of providing such an identifier is described in detail below.

Thus, the switches 32 are configured in manufacture of the cluster to connect to the correct processor node in response to a correct address for that node. Utilizing this form of connection eliminates the network configuration problems which are a large part of start-up problems in a cluster. Moreover, utilizing printed circuit or similar network cabling so shortens that cabling and reduces its energy expenditure that it allows the signaling techniques utilized by the network to be of a type typically utilized in optical transfers of data. This greatly reduces the power required to operate the second network 31 and, consequently, the cluster itself.

The use of low power components reduced to the minimum necessary to provide processing functions coupled with the reduction of network components to a minimum with power-saving cabling allows a large plurality of processor nodes to be physically placed within an enclosure of a size which would be considered typical for a work station of the prior art. In fact, one embodiment includes ninety-six processor nodes within such an enclosure and is powered by a simple power plug into a socket which might normally power a personal computer. Obviously, the power expenditure is drastically less than that required to operate a typical cluster.

The command and control network 30 is a unique arrangement which has never been used in a cluster arrangement before the present invention. The use of this new network allows a significant portion of the software usually necessary to control a cluster to be eliminated and thereby effectively eliminates the problems attendant on starting a cluster and maintaining a cluster in operation.

In a preferred embodiment, the command and control network 30 (illustrated in FIG. 4 and FIG. 6) is essentially a hardwired bus providing slots into which individual circuit boards 34 each supporting a plurality of processor nodes 21 and associated circuitry may be positioned. Each such circuit board with its processor nodes 21 is positioned in a slot on the network 30 where the nodes may be addressed for example by using the individual processor node identifiers. This eliminates a significant portion of the software control normally needed in order to utilize a cluster arrangement in accordance with the prior art.

Figure 4:
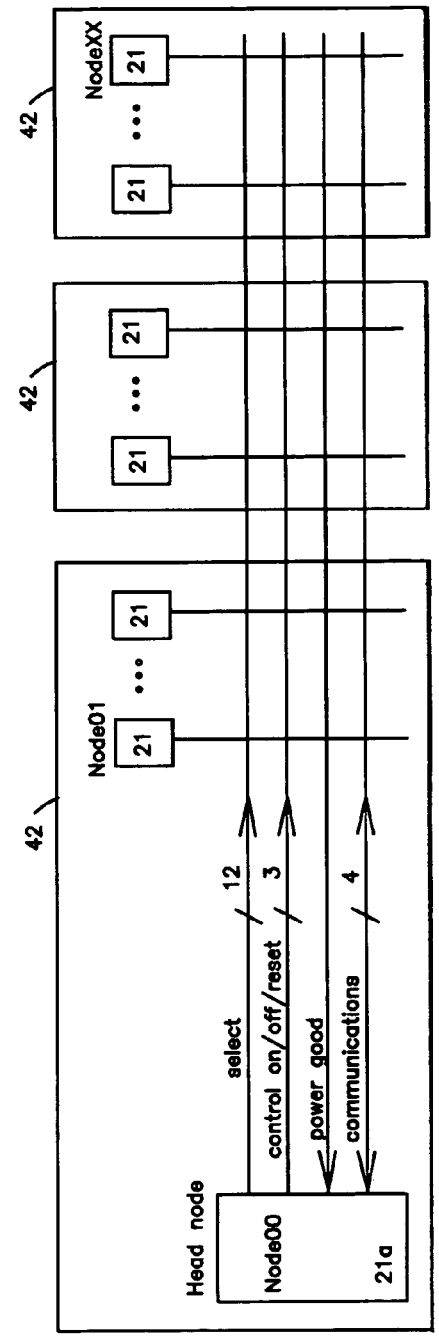
FIG. 4 is a diagram illustrating a second network for a computer cluster designed in accordance with the present invention.
Figure 5:
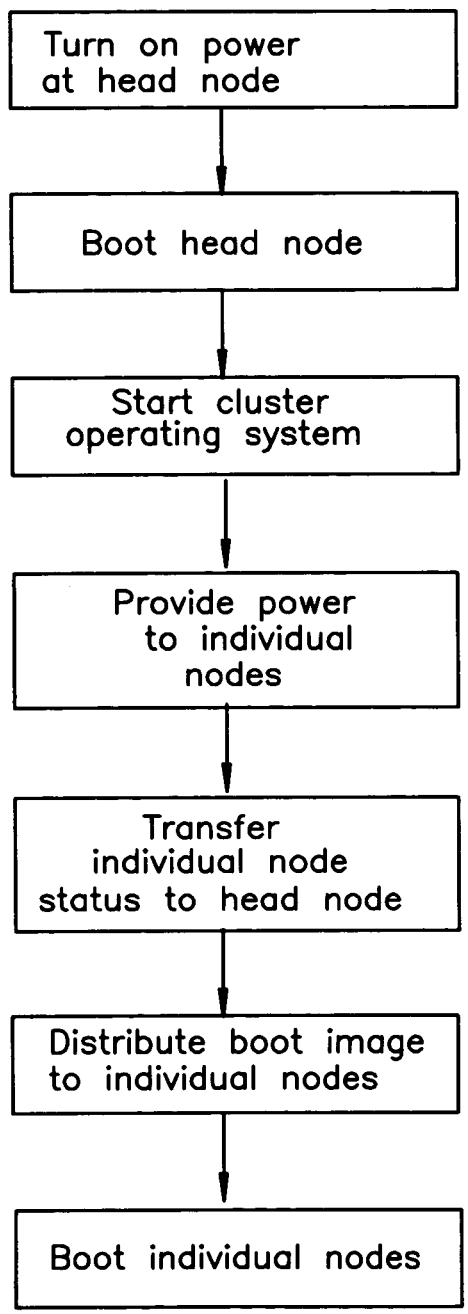
FIG. 5 is a flow chart illustrating the operation of a cluster system which may utilize the invention.

As shown in FIG. 4, the bus of the network 30 includes conductors for selecting a particular processor node, for controlling the operation of the selected processor node 21, for signaling the operating condition of the selected processor node, and for communicating with the selected processor node.

The network 30 allows a single operator at the processor node 21a to start up and operate the cluster without other operating personnel. This is to be contrasted with prior art clusters which require the constant attendance by a staff of computer scientists during both start-up and operation.

Starting the cluster requires a minimum of time rather than the hours or days typical of starting large prior art clusters. Since the switches of the network 31 of the preferred embodiment are hardwired, no initial configuration is required. Power is simply provided to the processor node 21a, and that processor node boots up cluster operating system software. Once the node 21a has booted and is running the cluster operating system, the node 21*a* runs a process which boots each of the processors of the individual nodes 21 in sequence. This is accomplished in each case by addressing the particular node 21 on the network 30 with one of the available commands (ON, OFF, RESET), in this case "ON." In a preferred embodiment, the network 30 provides an indication of the status of the processor node selected over conductors indicating processor condition (e.g., power good). When the selected processor node has turned on, it communicates with the head node 21*a* by communication conductors on the network 30 that it is ready to boot. In response to this signal from the selected processor node, the processor node 21*a* runs a process which distributes the operating system boot image to the selected processor node over communication conductors of the network 30. The boot image is placed into memory on the selected node, and the selected node boots. This continues in sequence for each of the nodes of the cluster. It should be noted that a broadcast process of booting may be utilized instead of a sequential process.

The present invention assigns the unique identity of each processor node of the cluster in a new manner. Each position of each of the circuit cards upon which the processor nodes are placed is furnished a positional identification. For example, a first processor node position on a card may have a "00" positional address, the next processor node position may have a "01" positional address, and so on through the last processor node position on the card. If there are twelve individual processor nodes positioned on a card, for example, then the individual processor node positions may be identified as node 00 through node 11. Each processor node position on each of the cards is identified identically.

Then, each of the card positions is similarly assigned a position number on the control network 30. In one embodiment of the invention, eight individual cards are positioned along the control network 30 in network positions identified as card position 00 through card position 07.

The node positional identifiers and the card positional identifiers are then combined to provide a unique positional identifier for each of the individual processor nodes on the network 30. The node positional identifiers are used in addressing the individual nodes on the network 30.

For example, as the individual nodes of the cluster are being booted, each is addressed in turn during a serial turn-on of all of the nodes through the use of its positional identifier. Thus, the head processor node 21*a* initiates a signal on the network 30 addressing the next processor node 01 on the first card 01 using the combined positional identifier with the command "ON." The command is detected by the processor node 01 on the first card 00 as addressed to that node and so is received and implemented by that identified processor node. As explained above, the identified node 01 responds to the command by turning on and signaling its condition (e.g., power good) to the processor node 21*a* on the network 30.

In one embodiment, a sufficient number of conductors are provided on the network 30 to allow approximately one thousand individual processor nodes to be indicated by positional identifiers. In this embodiment, four lowest order binary bits are provided for each processor node position on a card 34, and the six next highest order binary bits are provided for each card position on the network 30. Using this level of encoding allows the total number of individual processor nodes to be expanded within any particular enclosure to a number up to the total of positions available. It should be noted that means such as ROM memory for encoding a positional identifier might be used instead of the number of conductors on the network 30.

As a practical manner, it is probably practical to provide a smaller number of nodes (e.g., ninety-six) within a single enclosure in order to make use of individual components such as power supplies which are more economically available and thereby maintain a lower overall purchase cost for a cluster. FIG. 4 illustrates a plurality of individual enclosures 42 each of which may include such a smaller number of processor nodes. All of the individual enclosures are positioned along the network 30. With this arrangement, the individual card positions on the network 30 are ordered serially from the lowest to highest card position identifier available on network 30. In one embodiment, this is accomplished by providing connectors which extend the network 30 from enclosure to enclosure. Within any enclosure, the three lowest bits of the six bits used for card position identification are the same for cards in the same position within an enclosure. Then the three higher order bits are utilized to indicate which enclosure the cards are within. As each additional enclosure is added to the network 30, these higher order bits identifying the enclosures allow identifying the card positions in all of the enclosures to be uniquely identified along the network 30.

Consequently, each of the individual processor nodes can be uniquely identified on the network 30.

As pointed out above, providing unique identifiers allows these identifiers to be utilized in providing IP addresses for the individual nodes on the communication network 31. With such identifiers being available, the details of programming the software utilized for controlling the operations of the cluster and its individual processor nodes becomes more simple. This is especially important when dealing with freely available software in maintaining the operating costs of the cluster as low as possible.

A distinct advantage of the invention is that the control network 30 allows the processor node 21*a* to provide the same boot image to each of the other processor nodes 21 of the cluster. Consequently, each processor node is forced to run identical software each time the cluster is booted. This is to be contrasted to the typical cluster in which each individual computer boots itself from locally stored system software making that particular processor subject to the peculiarities of the software stored and the various versions of hardware utilized in the individual computers. Providing a single boot image to all processor nodes overcomes one of the major difficulties to which clusters of the prior art have been subject; that is, software differences between the different computers of the clusters generate interferences which ultimately interfere with the operation of the cluster and require the need for constant administration by large staffs.

Moreover, in contrast to prior art arrangements, the present invention eliminates the need to keep a cluster running. If a malfunction occurs, the cluster may simply be shut down and rebooted thereby providing identical operating system software to each of the processing nodes. In a presently operating embodiment of the invention, the process of booting or rebooting takes only slightly more than two minutes, significantly less than the hours or days required by prior art clusters.

Although the present invention has been described in terms of a preferred embodiment, it will be appreciated that various modifications and alterations might be made by those skilled in the art without departing from the spirit and scope of the invention. It should be that the preferred embodiment utilizes long term memory associated with the head processing node in order to provide an identical boot image to each of the processing nodes. However, there are a number of different ways in which providing an identical image might be accomplished. For example, the particular long term memory might be read-only memory rather than hard disk memory. It would be possible to utilize other than the head node to run the boot image software initially while monitoring the operation at the head node. The invention should therefore be measured in terms of the claims which follow.

What is claimed is:

1. A control network for a computer cluster, comprising:
   a base circuit board having a plurality of slots, the plurality of slots connected by a bus to communicate commands;
   a plurality of processor cards, each of the plurality of processor cards being seated in one of the plurality of slots, each processor card assigned a card positional address based on a slot position, the bus further providing communication between the plurality of processor cards; and
   a plurality of processor nodes being positioned on each processor card, each processor node being assigned a node positional address based on a physical location on respective ones of the processor cards,
   wherein the node positional address and the card positional address define a processor node of the computer cluster and wherein the plurality of processor nodes are connected in a cluster network that uses hardwired switches.

2. A control network as claimed in claim 1, wherein commands are communicated to a particular processor node based on the card positional address and the node positional address.

3. A control network as claimed in claim 2, further comprising:
   bus conductors to select the particular processor node;
   bus conductors to control operations of the particular processor node; and
   bus conductors to report the operating conditions of the particular processor node.

4. A cluster of computers comprising:
   a base circuit board having a plurality of slots connected by a bus to communicate commands, the plurality of slots each assigned a slot positional address;
   a first processor card seated in one of the plurality of slots having a plurality of processor nodes located on the first processor card, each of the plurality of processor nodes assigned a node positional address based on a physical location on the first processor card;
   a second processor card seated in a second one of the plurality of slots, the second processor card having a plurality of processor nodes located on the second processor card, each of the plurality of processor nodes assigned a node positional address based on a physical location on the second processor card; and
   a command network connecting to each of the processor nodes, wherein the command network further provides communication between the first processor card and the second processor card and wherein each plurality of processor nodes are connected in a cluster network that uses hardwired switches.

5. A cluster of computers as claimed in claim 4, wherein the slot positional address and node positional address are used to communicate commands to individual processor nodes.

6. A cluster of computers as claimed in claim 4 further comprising:
   bus conductors to report the operating conditions of the particular processor node.

7. A cluster of computers as claimed in claim 4, further comprising:
   a second or more processor cards seated in ones of the plurality of slots having a plurality of processor nodes, each of the plurality of processor nodes assigned a node positional address based on a physical location on the second or more processor cards.

8. A control network for a computer cluster, comprising:
   a base circuit board having a plurality of slots;
   a first processor card being seated in a first slot of the plurality of slots, the first processor card assigned a card positional address associated with a physical location of the first slot;
   a second processor card being seated in a second slot of the plurality of slots, the second processor card assigned a card positional address associated with a physical location of the second slot; and
   a plurality of processor nodes being located on each processor card, each of the plurality or processor nodes being assigned a node positional address defined by a physical location on the processor card, wherein the control network provides communication between the first processor card and the second processor card and wherein the plurality of processor nodes are connected in a cluster network that uses hardwired switches.

9. A control network as in claim 8, wherein the control network communicates are directed to individual processor nodes based on the card positional address and the node positional address.

* * * * *